UNITED STATES PATENT OFFICE.

CHARLES H. BELLAMY, OF PHILADELPHIA, PENNSYLVANIA, ASSIGNOR TO MONE R. ISAACS, OF SAME PLACE.

SIZING AND METHOD OF TREATING OR PREPARING SAME.

SPECIFICATION forming part of Letters Patent No. 681,435, dated August 27, 1901.

Application filed January 30, 1901. Serial No. 45,380. (No specimens.)

*To all whom it may concern:*

Be it known that I, CHARLES H. BELLAMY, of the city and county of Philadelphia, State of Pennsylvania, have invented an Improvement in Sizing and Method of Treating or Preparing the Same, of which the following is a specification.

My invention relates to sizing and to a method of treating or preparing the same to improve the quality and strength thereof and is fully described in the following specification. The quality of sizing depends largely upon its glutinous character. The best results are obtained from gum-arabic, $(C_{12}H_{20}O_{10},)$ which is used to a small extent upon fine grades of silk, but cannot be used generally on account of the expense. Ordinary sizings—such as glue, resin, starch, and dextrine—do not possess the smoothness or high mucilaginous properties of gum-arabic, but are generally used because they are less expensive.

It is the object of my invention to treat the ordinary animal and vegetable proteids—such as hide glue, casein glue, shellac, resin, starch, gums, &c.—commonly used as sizings to increase their smoothness and mucilaginous properties to a degree closely approximating the properties of gum-arabic. The size thus treated possesses the additional quality of acting as a mordant to fix colors in the sized materials, such as paper and textile fabrics. I have discovered that these results can be obtained by treating the size to an alkaline arsenate or by combining the same with the proteid. This alkaline arsenate may be obtained by the use of either arsenic acid $(H_3AsO_4)$ or arsenic trioxid, $(As_2O_3.)$ From the arsenic acid I obtain an arsenate by combining it with a suitable alkaline base. Any alkali base may be used, such, *e. g.*, as magnesium, potassium, sodium, calcium, or ammonium.

With magnesium hydrate, $Mg(HO)_2$, the reaction is as follows:

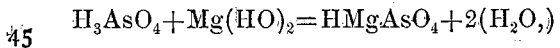

the product being a solution of magnesium arsenate. The arsenate may be obtained in practice by heating the arsenic acid and the alkaline base together in solution. I have found most satisfactory results from mixing one pound of the hydrate with eight ounces of arsenic acid in a gallon of water. I prefer to heat the water, as it hastens the reaction. To this a small quantity of starch may be added to hold the arsenate in suspension. The product obtained is a thick mucilaginous paste. In practice I have found that satisfactory results may be obtained by adding four ounces of starch to a gallon of the arsenic solution. If, however, the arsenate is to be used directly, the addition of the starch is unnecessary.

With potassium as the base potassium arsenate is obtained, either $K_3AsO_4$ or $K_2HAsO_4$, or both, the reaction being obtained by boiling caustic potash (KOH) in solution with the arsenic. With soda as the base sodium arsenate $(Na_2HAsO_4)$ is obtained, the action being obtained by boiling carbonate of soda $(Na_2CO_3)$ in solution with the arsenic. With calcium a calcium arsenate $(CaHAsO_4)$ is obtained by boiling chlorid of calcium $(CaCl_2)$ with the arsenic. With ammonium an ammonium arsenate, $(NH_4)_2HAsO_4$, is obtained from an aqueous solution of ammonia $(NH_3Aq)$ and arsenic. With arsenic trioxid $(A_2O_3)$ the same ultimate reactions may be obtained, as the trioxid, when combined with water and the alkali, reacts to produce the arsenate of the alkali metal employed. Satisfactory results may be obtained by combining the arsenic trioxid and base in the same proportions as the arsenic acid and the hydrate—*i. e.*, one pound of the base to eight ounces of arsenic trioxid in a gallon of water. I do not mean to limit myself to these proportions, as the proportions may be varied to conform with the desired results. The arsenical paste or compound thus produced is added to the sizing in suitable proportions, the amount of which depends upon the character of the size employed and the results desired. In practice I have found that one quart of the arsenical paste added to one hundred pounds, dry weight, of starch will produce an excellent size. The arsenical paste reacts upon the proteid in the presence of water and greatly increases its smoothness and mucilaginous quality, imparting to it qualities very similar to those possessed by gum-arabic sizing. I have discovered that the arsenical paste also acts to fix colors in the sized paper or fabric. This I understand is due to the fact that the arsenic reacts on the starchy matter or proteid in the fibers of the paper or fabric, and thus forms a bond between them and the size which fixes the color. Instead of preparing the arsenical paste as a commercial product to be added to ordinary sizing it may be mixed directly with the proteids and the sizing may be produced as a commercial product. So, also, instead of forming a paste the arsenic and base may be mixed together in a dry state, whether alone or in combination with the dry ground or powdered proteids, to be converted into sizing upon the addition of water by the user. A sizing composition may be thus prepared by mixing one pound of alkali hydrate and eight ounces of arsenic acid with one hundred pounds of dry starch. Upon the addition of water the chemical reaction will take place and the arsenate produced will react upon the starch in the manner described. The arsenical composition may also be used as a mordant in dyeing processes and with paints, dyes, and stains to fix the colors to the materials to which the colors are applied.

What I claim as new, and desire to secure by Letters Patent, is as follows:

1. The herein-described method of preparing sizing which consists in combining an arsenate of an alkali metal with animal or vegetable proteids in the presence of water.

2. The herein-described method of enriching animal or vegetable sizing which consists in adding thereto an arsenate of an alkali metal in a pasty condition.

3. The herein-described sizing consisting of an arsenate of an alkali metal and animal or vegetable proteid combined in the proportions and the manner substantially as set forth.

4. The herein-described method of enriching animal or vegetable sizing which consists in adding thereto an arsenate of an alkali metal.

5. The herein-described method of enriching animal or vegetable sizing which consists in adding thereto a magnesium arsenate.

6. The herein-described arsenical paste for enriching sizing, &c., consisting of arsenic and a base combined in the presence of water substantially as set forth.

7. The arsenical paste for enriching sizing, &c., consisting of arsenic, starch and a base combined in the presence of water substantially as set forth.

8. The arsenical paste for enriching sizing, &c., consisting of arsenic acid, a base and water combined in the manner substantially as set forth.

In testimony of which invention I have hereunto set my hand.

CHAS. H. BELLAMY.

Witnesses:
GEO. W. REED,
ERNEST HOWARD HUNTER.